US012763095B2

(12) United States Patent
Chen

(10) Patent No.: US 12,763,095 B2
(45) Date of Patent: Oct. 13, 2026

(54) AUDIO SIGNAL PROCESSING DEVICE AND AUDIO SIGNAL PROCESSING METHOD

(71) Applicant: MEDIATEK INC., Hsinchu City (TW)

(72) Inventor: Wei-Hau Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 189 days.

(21) Appl. No.: 18/733,223

(22) Filed: Jun. 4, 2024

(65) Prior Publication Data

US 2025/0372118 A1 Dec. 4, 2025

(51) Int. Cl.
*G10L 25/60* (2013.01)

(52) U.S. Cl.
CPC .................................... *G10L 25/60* (2013.01)

(58) Field of Classification Search
CPC ........................................................ G10L 25/60
See application file for complete search history.

(56) References Cited

U.S. PATENT DOCUMENTS 10,446,170 B1 * 10/2019 Chen ...................... G06N 20/00
2016/0148615 A1 * 5/2016 Lee ....................... G06F 1/3215 704/275
2019/0180735 A1 * 6/2019 Mcelhaney ............. G10L 15/02
2022/0139371 A1 * 5/2022 Sharifi .................... G10L 15/08 704/231
2023/0036986 A1 * 2/2023 Visser .................. H04R 1/1083
2023/0097522 A1 * 3/2023 Mehrabi ................ G10L 25/84 381/56
2024/0089671 A1 * 3/2024 Loza ....................... G06F 3/167
2024/0311076 A1 * 9/2024 Balsam ................... G10L 15/22

FOREIGN PATENT DOCUMENTS

GB 2501367 A * 10/2013 ............ H04W 52/02
WO WO-2023081315 A1 * 5/2023 ........... H03G 3/3089

* cited by examiner

*Primary Examiner* — Mohammad K Islam
(74) *Attorney, Agent, or Firm* — McClure, Qualey & Rodack, LLP

(57) ABSTRACT

An audio signal processing method for a digital audio signal is provided. The audio signal processing method includes a step of performing a classification on the digital audio signal to determine a specific classification corresponding to the digital audio signal. The specific classification is one of a plurality of predetermined classifications. The plurality of predetermined classifications comprise at least two predetermined classifications for a sound situation, and the at least two predetermined classifications correspond to different resource configurations. The audio signal processing method includes a step of processing the digital audio signal based on a specific resource configuration corresponding to the specific classification. The specific resource configuration is one of a plurality of predetermined resource configurations, and the plurality of predetermined resource configurations are associated with the plurality of predetermined classifications.

18 Claims, 3 Drawing Sheets

AUDIO SIGNAL PROCESSING DEVICE AND AUDIO SIGNAL PROCESSING METHOD

BACKGROUND OF THE INVENTION

Field of the Invention

The invention relates to an audio signal processing device and method.

Description of the Related Art

In a system on chip (SOC), computing resource is valuable. For an SOC used in an audio application, resource requirements depend on acoustic environment. A current solution is provided to define two configurations of computing resources for two situations of acoustic environment: one for a sound situation and another for a non-sound situation. However, in the current solution, the highest level of the computing resources are all enabled for the sound situations, which results in high power consumption of the SoC.

BRIEF SUMMARY OF THE INVENTION

An exemplary embodiment of an audio signal processing method for a digital audio signal is provided. The audio signal processing method comprises a step of performing a classification on the digital audio signal to determine a specific classification corresponding to the digital audio signal. The specific classification is one of a plurality of predetermined classifications. The plurality of predetermined classifications comprise at least two predetermined classifications for a sound situation, and the at least two predetermined classifications correspond to different resource configurations. The audio signal processing method comprises a step of processing the digital audio signal based on a specific resource configuration corresponding to the specific classification. The specific resource configuration is one of a plurality of predetermined resource configurations, and the plurality of predetermined resource configurations are associated with the plurality of predetermined classifications.

An exemplary embodiment of an audio signal processing device is provided. The audio signal processing device comprises a storage device and a processor. The storage device stores a classification model. The processor is configured to load the classification model from the storage device and perform the classification module on a digital audio signal to determine a specific classification corresponding to the digital audio signal. The specific classification is one of a plurality of predetermined classifications. The plurality of predetermined classifications comprise at least two predetermined classifications for a sound situation, and the at least two predetermined classifications correspond to different resource configurations. The processor is further configured to process the digital audio signal based on a specific resource configuration corresponding to the specific classification. The specific resource configuration is one of a plurality of predetermined resource configurations, and the plurality of predetermined resource configurations are associated with the plurality of predetermined classifications.

According to the above embodiments, the prevent invention perform the digital audio signal based on different resource configurations for a sound situation, rather than always enabling the highest level of computing resources, thereby avoiding using unnecessary computing resource. Thus, power consumption can be decreased.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
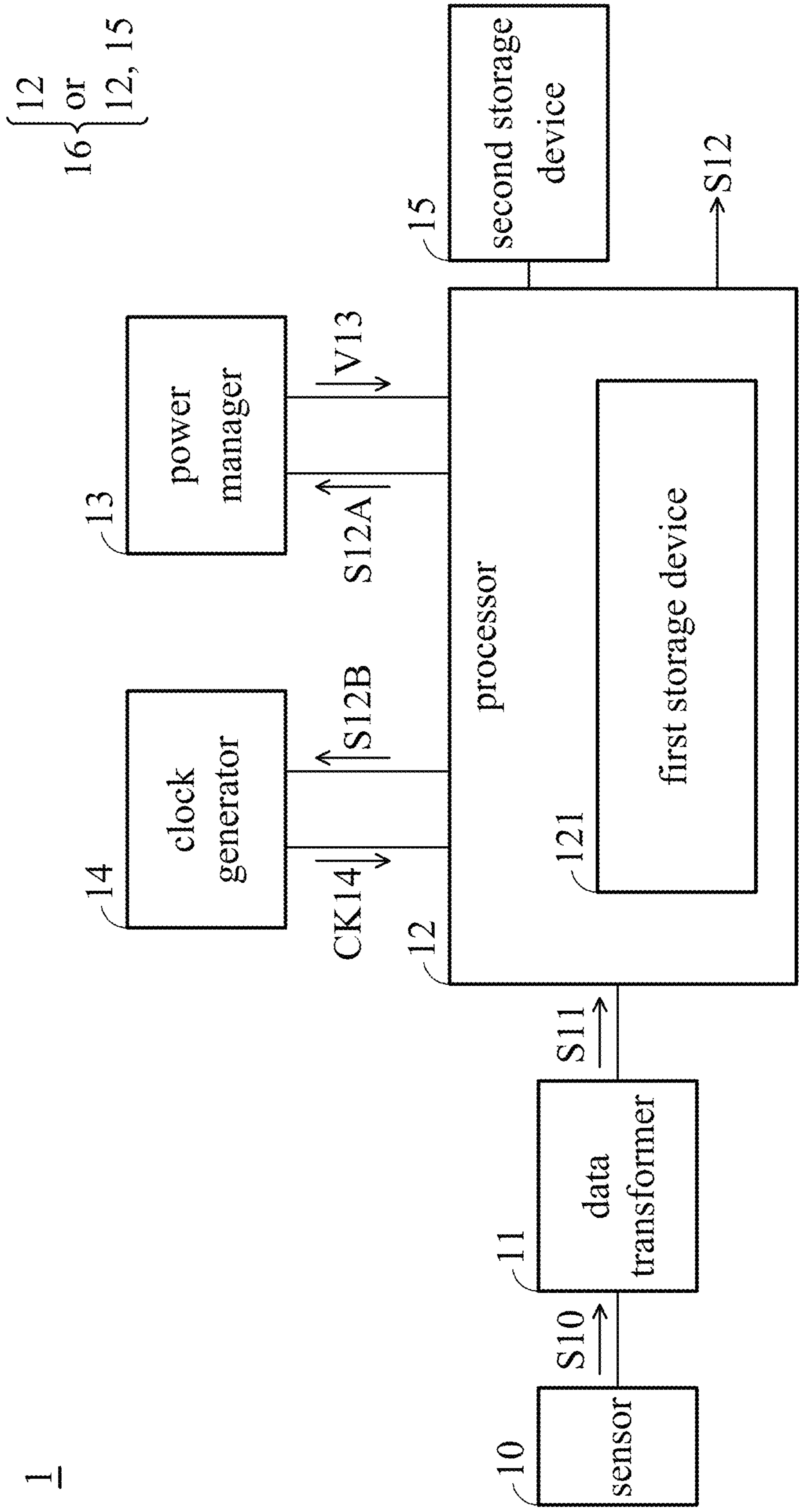
FIG. 1 shows an exemplary embodiment of an electronic apparatus.

FIG. 1 shows an exemplary embodiment of an electronic apparatus. As shown in FIG. 1, an electronic apparatus 1 comprises a sensor 10, a data transformer 11, a processor 12, a power manager 13, a clock generator 14, and a storage device. For example, the storage device may comprise any type of storage devices located internally and/or externally to the processor 12, which is configured for storing program codes, buffering data, and the like. As illustrated in FIG. 1, the storage device may comprise a first storage device 121 located inside the processor 12 and a second storage device 15 located outside the processor 12. Generally speaking, the first storage device 121 and the processor 12 are located on the same integrated circuit (IC), while the second storage device 15 is associated with a different IC from that of the processor 12. In other words, the first storage device 121 is dedicated for access by the processor 12, whereas the second storage device 15 is shared and can be accessed by several processors including the processor 12. It should be noted that the communication between the processor 12 and the first storage device 121 offers advantages such as faster access speeds and lower power consumption, but it's more expensive. Therefore, the storage capacity of the first storage device 121 is generally limited, whereas the second storage device 15, positioned externally, can offer substantially greater storage capacity. In one example, the first storage device 121 may be an SRAM (Static Random-Access Memory), and the second storage device 15 may be a DRAM (Dynamic Random-Access Memory), but the present disclosure is not limited to these types. In an embodiment, the electronic apparatus 1 is capable of sensing sound around the electronic apparatus 1 and processing a corresponding audio signal, such as a mobile phone, a tablet, or earphones. Similarly, the audio signal processing device 16 provided in the disclosure may include the processor 12 and a storage device, such as the first storage device 121 and/or the second storage device 15.

The sensor 10 is configured to sense the sound transmitted to the sensor 10 and to convert the sensed sound to an electronic signal. In an embodiment, the sensor 10 is a microphone which senses the sound transmitted to the microphone and converts the sensed sound to an analog audio signal S10.

The data transformer 11 (such as Codec) is coupled to the sensor 10. The data transformer 11 receives the analog audio signal S10 and performs a transformation operation on the analog audio signal S10 for transforming the data formation of the analog audio signal S10. According to an embodiment, the data transformer 11 is configured to transform the analog audio signal S10 to a digital audio signal S11. In one embodiment, the data transformer 11 is a Codec. Optionally, the Codec may also be integrated within the sensor 10, such as a microphone. However, the present disclosure is not limited to this configuration.

Referring to FIG. 1, the power manager 13 is coupled to the processor 12 and controlled by the processor 12 to provide a power signal V13 and the voltage of the power signal V13 can be provided as an operating voltage of the processor 12. The clock generator 14 is coupled to the processor 12 and controlled by the processor 12 to provide a clock signal CK14. The frequency of the clock signal CK14 can be served as an operating frequency of the processor 12. In the present disclosure, the power manager 13 is configured to provide a power signal with a corresponding voltage level to the processor 12 based on a resource configuration of the processor 12 (for example, through control signals S12A), and the clock generator 14 is configured to provide a clock signal with a corresponding frequency to the processor 12 based on a resource configuration of the processor 12 (for example, through control signals S12B). Optionally, the power manager 13 and clock generator 14 may also be configured to provide the required power signal V13 and clock signal CK14 to the second storage apparatus 15 according to the resource configuration of the processor 12, although this is not shown in the FIG. 1.

In an embodiment, the second storage device 15 may be implemented by a read-only memory, a flash memory, a floppy disk, a hard disk, a compact disk, a flash drive, a magnetic tape, a network accessible database, or a storage medium having the same function by those skilled in the art. The second storage device 15 can be utilized to store program codes and data (such as, a classification model and a plurality of predetermined algorithms) used in a processing operation of the processor 12. In an embodiment, the classification model may be implemented by software, and this software can be executed by the processor 12. In another embodiment, some of the plurality of algorithms are stored in the first storage device 121, and the other some of the plurality of algorithms are stored in the second storage device 15. The classification model may be stored in the first storage device 121. Specifically, the plurality of algorithms are predetermined, and the different algorithms correspond to different levels of computing resources and different classifications. In the embodiment, there are at least two predetermined classifications for the sound situations, where the at least two predetermined classifications correspond to different predetermined algorithms and further to different resource configurations corresponding to different levels of computing resources. For example, more complex algorithms may require higher levels of computing resources. As a result, it is possible to use different levels of computing resources for processing different classifications of audio situations, thereby achieving greater power efficiency.

The processor 12 is coupled to the data transformer 11 to receive the digital audio signal S11. The processor 12 loads the classification model from the first storage device 121 or second storage device 15 and performs the classification model to determine the specific classification of the digital audio signal S11. For example, the processor 12 inputs the digital audio signal S11 to the classification model to determine the classification of the digital audio signal S11 as one of a plurality of predetermined classifications. In one example, the processor 12 may pre-process the digital audio signal S11 and extract relevant audio features (such as time-domain features, frequency-domain features, rhythmic features, and/or statistical features, among others, which are used to describe the characteristics of audio signals), and, thus, the specific classification of the digital audio signal S11 is determined through the analysis of these audio features. For example, the classification can be performed based on factors such as audio commands, types of the audio content, environmental noise, etc. It should be noted that the classification of digital audio signals may be performed based on extracted audio features derived from the digital audio signals, or alternatively, the classification may be executed directly without the extraction of audio features. However, the classification method is not restricted by the present disclosure.

In an embodiment, the classification model may be simple linear classifiers or complex neural network architecture. For example, the neural network architecture is implemented by a convolutional neural network (CNN).

After the specific classification is determined, the corresponding resource configuration can be determined, and the processor 121 can determine which one of the algorithms stored in the storage device will be applied to process the digital audio signal S11. As described above, different classifications are associated with distinct resource configurations and algorithms, and the different algorithms correspond to different levels of the computing resources. For example, a more complex algorithm corresponds to a higher level of the computing resource. Thus, the processor 121 can determine a specific resource configuration (corresponding to a specific level of the computing resource) and a specific algorithm for processing the digital audio signal S11. Then, the processor 121 processes the digital audio signal S11 using the specific algorithm under the specific resource configuration corresponding to the specific classification. After the digital audio signal S11 is processed by the processor 121, then the processed audio signal S12 is output to an external device, for example, a speaker.

According to the embodiment, the processor 12 generates control signals S12A and S12B according to the determined specific classification and provides the control signals S12A and S12B respectively to the power manager 13 and the clock generator 14. The power manager 13 is controlled by the processor 12 through the control signal S12A to adjust or change the supply voltage V13. The clock generator 14 is controlled by the processor 12 through the control signal S12B to adjust or change frequency of the clock signal CK14.

In the embodiment, the specific resource configuration corresponding to the specific level of the computing resource for the processor 12 comprises an operating voltage (for example, the supply voltage V13), an operating frequency (for example, the frequency of the clock signal CK14), clock resource for the clock generator 14, an operating state of a memory accessed by the processor 12 (for example, an SRAM or a DRAM), and/or an operating state of a co-processor operating with the processor 12.

According to the embodiment of the present disclosure, the electronic apparatus 1 performs an appropriate algorithm with a specific level of computing resource according to at least one audio feature of the digital audio signal S11, thereby avoiding using unnecessary computing resource. Thus, the power consumption can be decreased.

Figure 2:
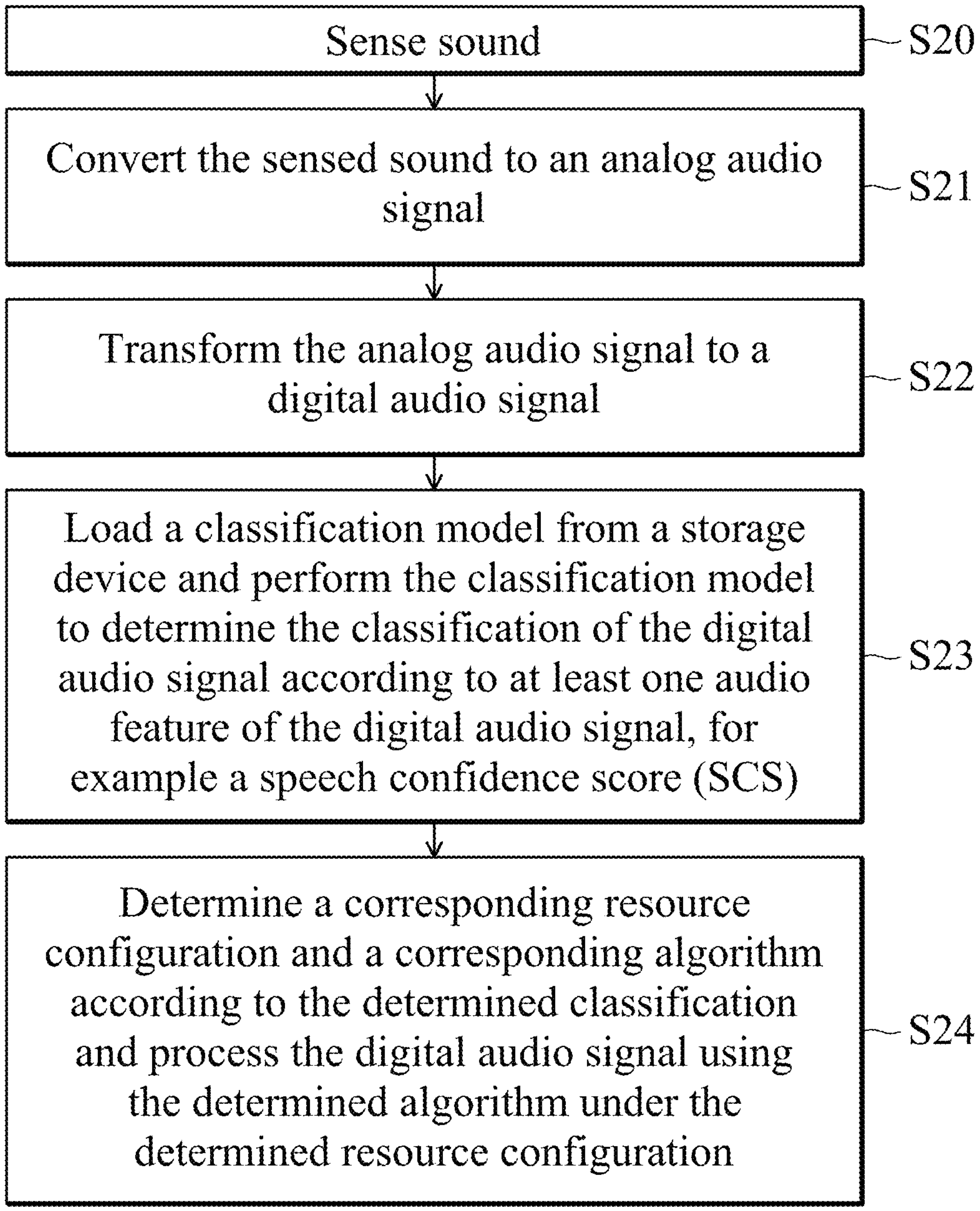
FIG. 2 shows one exemplary embodiment of an audio signal processing method.
Figure 3:
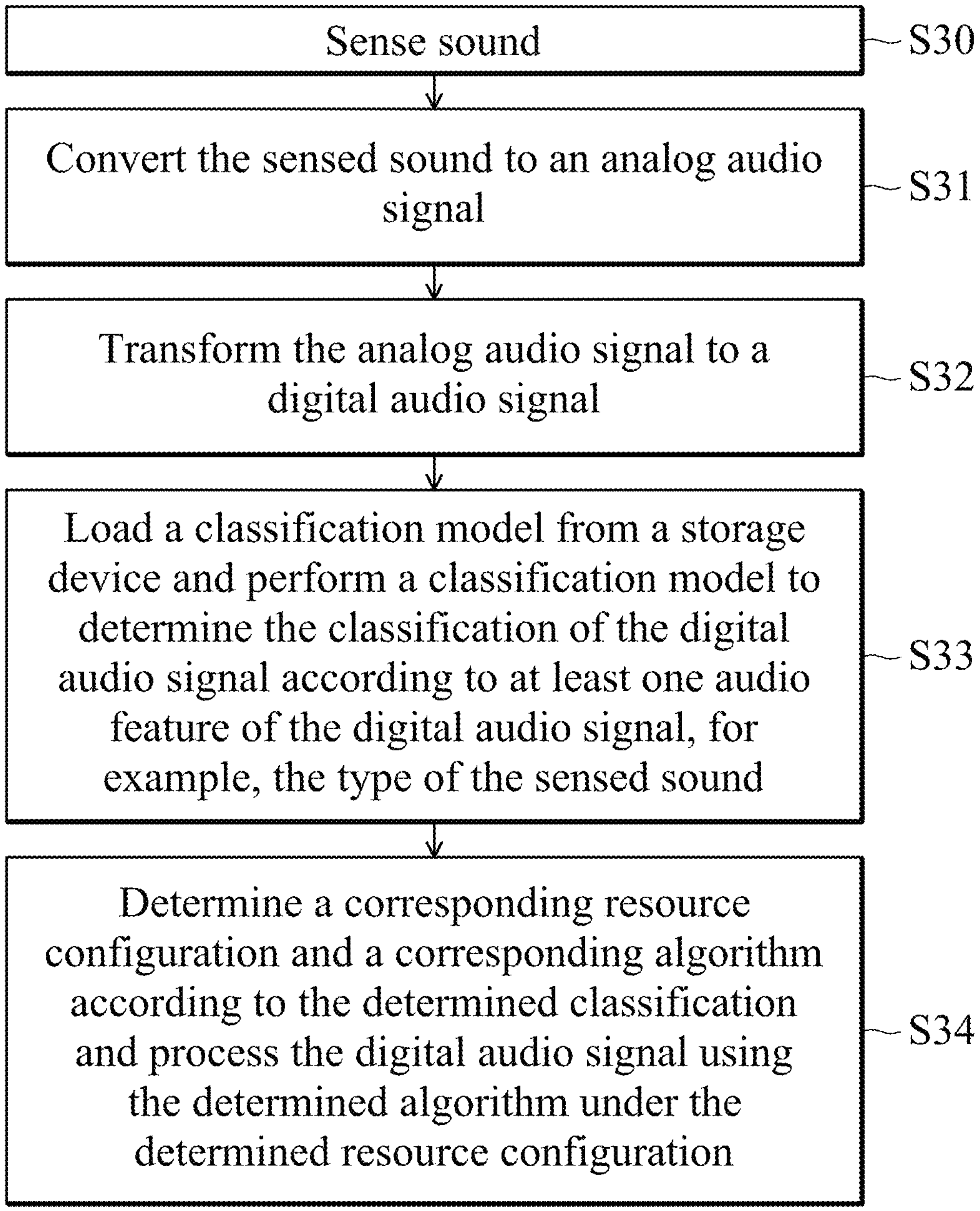
FIG. 3 shows another exemplary embodiment of an audio signal processing method.

The invention will be illustrated through FIG. 1 to FIG. 3.

FIG. 2 shows one exemplary embodiment of an audio signal processing method. The audio signal processing method in the embodiment of FIG. 2 is performed by the electronic apparatus 1. In the embodiment of FIG. 2, the algorithms stored in the first storage device 121 or the second storage device 15 are defined as noise reduction algorithms. Referring to FIG. 2, the audio signal processing method comprises:

Step S20: sensing sound;

Step S21: converting the sensed sound to an analog audio signal; and

Step S22: transforming the analog audio signal to a digital audio signal.

In an embodiment, referring to FIG. 1 and FIG. 2, the sensor 10 senses the sound transmitted to the sensor 10, and the sensor 10 converts the sensed sound to an analog audio signal S10. The data transformer 11 transforms the analog audio signal S10 to a digital audio signal S11.

Referring to FIG. 2, the audio signal processing method further comprises:

Step S23: loading a classification model from a storage device and performing the classification model to determine the classification of the digital audio signal according to at least one audio feature of the digital audio signal, for example a speech confidence score (SCS).

In an embodiment, referring to FIG. 1 and FIG. 2, the processor 12 loads a classification model from the first storage device 121 or second storage device 15 and performs the classification model to determine the classification of the digital audio signal S11 according to at least one audio feature of the digital audio signal S11. According to the embodiment, a plurality of predetermined classifications are predetermined for the classification model 150. For example, five predetermined classifications Class-21 to Class-25 are predetermined. The processor 12 obtains a speech confidence score (SCS) according to the digital audio signal S11. Thus, in the embodiment, the SCS represents one audio feature of the digital audio signal S11. Then, the processor 12 determines the classification of the digital audio signal S11 as one of the five predetermined classifications Class-21 to Class-25 according to the obtained SCS. As shown in Table 1, the predetermined classification Class-21 is defined for the SCS that is less than 0.1 (SCS<0.1), which indicates no sound; the predetermined classification Class-22 is defined for the SCS that is greater than 0.7 and less than or equal to 1 (0.7<SCS≤1), which indicates clean voice; the predetermined classification Class-23 is defined for the SCS that is greater than 0.5 and less than or equal to 0.7 (0.5<SCS≤0.7), which indicates voice with low noise; the predetermined classification Class-24 is defined for the SCS that is greater than 0.3 and less than or equal to 0.5 (0.3<SCS≤0.5), which indicates voice with normal noise; the predetermined classification Class-25 is defined for the SCS that is greater than 0.1 and less than or equal to 0.3 (0.1<SCS≤0.3), which indicates voice with high noise. As described above, the predetermined classifications Class-22 to Class-25 are predetermined for the sound situations.

Thus, there are five cases: the processor 12 determines the classification of the digital audio signal S11 as the predetermined classification Class-21 when the SCS is less than 0.1 (SCS<0.1); the processor 12 determines the classification of the digital audio signal S11 as the predetermined classification Class-22 when the SCS is greater than 0.7 and less than or equal to 1 (0.7<SCS≤1); the processor 12 determines the classification of the digital audio signal S11 as the predetermined classification Class-23 when the SCS is greater than 0.5 and less than or equal to 0.7 (0.5<SCS≤0.7); the processor 12 determines the classification of the digital audio signal S11 as the predetermined classification Class-24 when the SCS is greater than 0.3 and less than or equal to 0.5 (0.3<SCS≤0.5); the processor 12 determines the classification of the digital audio signal S11 as the predetermined classification Class-25 when the SCS is greater than 0.1 and less than or equal to 0.3 (0.1<SCS≤0.3).

TABLE 1

| Predetermined Classification | SCS | Levels of computing resource (low to high) | Algorithm (simple to complex) |
|---|---|---|---|
| Class-21 | No sound (SCS < 0.1) | Level-21 | Algo-21 |
| Class-22 | Clean voice (0.7 < SCS ≤ 1) | Level-22 | Algo-22 |
| Class-23 | Voice with low noise (0.5 < SCS ≤ 0.7) | Level-23 | Algo-23 |
| Class-24 | Voice with normal noise (0.3 < SCS ≤ 0.5) | Level-24 | Algo-24 |
| Class-25 | Voice with high noise (0.1 < SCS ≤ 0.3) | Level-25 | Algo-25 |

Referring to FIG. 2, after the classification of the digital audio signal S11 is determined, the audio signal processing method further comprises:

Step S24: determining a corresponding resource configuration and a corresponding algorithm according to the determined classification and processing the digital audio signal using the determined algorithm under the determined resource configuration.

In an embodiment, referring to FIG. 1 and FIG. 2, the processor 12 determines a corresponding resource configuration and a corresponding algorithm according to the determined classification of the digital audio signal S11 and processes the digital audio signal S11 using the determined algorithm under the determined resource configuration. Referring to Table 1, the algorithms Algo-21 to Algo-25 are performed under different levels of computing resources Level-21 to Level-25. The levels of the computing resources Level-21 to Level-25 are provided from low to high for the algorithms Algo-21 to Algo-25 provided from simple to complex. When the classification of the digital audio signal S11 is the predetermined classification Class-21, the processor 12 determines the algorithm Algo-21 and a specific resource configuration, which corresponds to the computing resource Level-21 required by the algorithm Algo-21, according to the determined classification. When the classification of the digital audio signal S11 is the predetermined classification Class-22, the processor 12 determines the algorithm Algo-22 and a corresponding resource configuration, which corresponds to the computing resource Level-22 required by the algorithm Algo-22, according to the determined classification. When the classification of the digital audio signal S11 is the predetermined classification Class-23, the processor 12 determines the algorithm Algo-23 and a corresponding resource configuration, which corresponds to the computing resource Level-23 required by the algorithm Algo-23, according to the determined classification. When the classification of the digital audio signal S11 is the predetermined classification Class-24, the processor 12 determines the algorithm Algo-24 and a corresponding resource configuration, which corresponds to the computing resource Level-24 required by the algorithm Algo-24, according to the determined classification. When the classification of the digital audio signal S11 is the predetermined classification Class-25, the processor 12 determines the algorithm Algo-25 and a corresponding resource configuration, which corresponds to the computing resource Level-25 required by the algorithm Algo-25, according to the determined classification.

FIG. 3 shows another exemplary embodiment of an audio signal processing method. The audio signal processing method in the embodiment of FIG. 3 is performed by the electronic apparatus 1. In the embodiment of FIG. 3, the algorithms stored in the first storage device 121 or second storage device 15 are defined as sound recognition algorithms. Referring to FIG. 1 and FIG. 3, the audio signal processing method comprises:

Step S30: sensing sound;

Step S31: converting the sensed sound to an analog audio signal; and

Step S32: transforming the analog audio signal to a digital audio signal.

In an embodiment, referring to FIG. 1 and FIG. 3, the sensor 10 senses the sound transmitted to the sensor 10, and the sensor 10 converts the sensed sound to an analog audio signal S10. The data transformer 11 transforms the analog audio signal S10 to a digital audio signal S11.

Referring to FIG. 3, the audio signal processing method further comprises:

Step S33: loading a classification model from a storage device and performing a classification model to determine the classification of the digital audio signal according to at least one audio feature of the digital audio signal, for example, the type of the sensed sound.

In an embodiment, referring to FIG. 1 and FIG. 3, the processor 12 loads a classification model from the first storage device 121 or second storage device 15 and performs the classification model to determine the classification of the digital audio signal S11 according to at least one audio feature of the digital audio signal S11. According to the embodiment, a plurality of predetermined classifications are present for the classification model 150. For example, five predetermined classifications Class-31 to Class-35 are predetermined. The processor 120 determines the type of the sensed sound according to the digital audio signal S11. Thus, in the embodiment, the type of the sensed sound represents one audio feature of the digital audio signal S11. Then, the processor 12 determines the classification of the digital audio signal S11 as one of the five predetermined classifications according to the determined type of the sensed sound. As shown in Table 2, the five types are provided for the sensed sound: the sound of dog barking, the sound of broken glass, the sound of gunfire, the sound of baby crying, and no sound. As described above, the predetermined classifications Class-31 to Class-34 are predetermined for the sound situations.

Thus, there are five cases: the processor 12 determines the classification of the digital audio signal S11 as the predetermined classification Class-31 when the type of the sensed sound is "dog braking"; the processor 12 determines the classification of the digital audio signal S11 as the predetermined classification Class-32 when the type of the sensed sound is "broken glass"; the processor 12 determines the classification of the digital audio signal S11 as the predetermined classification Class-33 when the type of the sensed sound is "gunfire"; the processor 12 determines the classification of the digital audio signal S11 as the predetermined classification Class-34 when the type of the sensed sound is "baby crying"; and the processor 12 determines the classification of the digital audio signal S11 as the predetermined classification Class-35 when the type of the sensed sound is "no sound".

TABLE 2

| Predetermined Classification | Type of sensed sound | Levels of computing resource | Algorithm |
|---|---|---|---|
| Class-31 | Dog barking | Level-31 | Algo-31 |
| Class-32 | Broken glass | Level-32 | Algo-32 |
| Class-33 | Gunfire | Level-33 | Algo-33 |
| Class-34 | Baby crying | Level-34 | Algo-34 |
| Class-35 | No sound | Level-35 | Algo-35 |

Referring to FIG. 3, after the classification of the digital audio signal S11 is determined, the audio signal processing method further comprises:

Step S34: determining a corresponding resource configuration and a corresponding algorithm according to the determined classification and process the digital audio signal using the determined algorithm under the determined resource configuration.

In an embodiment, referring to FIG. 1 and FIG. 3, the processor 12 determines a corresponding resource configuration and a corresponding algorithm according to the determined classification of the digital audio signal S11 and processes the digital audio signal S11 using the determined algorithm under the determined resource configuration. Referring to Table 2, the algorithms Algo-31 to Algo-35 are performed under different levels of computing resources Level-31 to Level-35. When the classification of the digital audio signal S11 is the predetermined classification Class-31, the processor 121 determines the algorithm Algo-31 and a corresponding resource configuration, which corresponds to the computing resource Level-31 required by the algorithm Algo-31, according to the determined classification. When the classification of the digital audio signal S11 is the predetermined classification Class-32, the processor 12 determines the algorithm Algo-32 and a corresponding resource configuration, which corresponds to the computing resource Level-32 required by the algorithm Algo-32, according to the determined classification. When the classification of the digital audio signal S11 is the predetermined classification Class-33, the processor 12 determines the algorithm Algo-33 and a corresponding resource configuration, which corresponds to the computing resource Level-33 required by the algorithm Algo-33, according to the determined classification. When the classification of the digital audio signal S11 is the predetermined classification Class-34, the processor 12 determines the algorithm Algo-34 and a corresponding resource configuration, which corresponds to the computing resource Level-34 required by the algorithm Algo-34, according to the determined classification. When the classification of the digital audio signal S11 is the predetermined classification Class-35, the processor 12 determines the algorithm Algo-35 and a corresponding resource configuration, which corresponds to the computing resource Level-35 required by the algorithm Algo-35, according to the determined classification.

According to the above embodiments, the present invention performs an appropriate algorithm under a specific level of computing resource for a sound situation, thereby avoiding using unnecessary computing resource. Thus, power consumption can be decreased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An audio signal processing method for a digital audio signal, comprising:

performing a classification on the digital audio signal to determine a specific classification corresponding to the digital audio signal, wherein the specific classification is one of a plurality of predetermined classifications, the plurality of predetermined classifications comprise at least two predetermined classifications for a sound situation, and the at least two predetermined classifications correspond to different resource configurations; and processing the digital audio signal based on a specific resource configuration corresponding to the specific classification, wherein the specific resource configuration is one of a plurality of predetermined resource configurations, and the plurality of predetermined resource configurations are associated with the plurality of predetermined classifications;

wherein the specific resource configuration comprises at least two of an operating voltage, an operating frequency, clock resource, an operating state of an SRAM, an operating state of a DRAM, and/or an operating state of a co-processor.

2. The audio signal processing method as claimed in claim 1, wherein performing the classification on the digital audio signal to determine the specific classification corresponding to the digital audio signal comprises:

obtaining a speech confidence score (SCS) of the digital audio signal; and determining the specific classification of the digital audio signal according to the SCS.

3. The audio signal processing method as claimed in claim 2, wherein the plurality of predetermined classifications are associated with a plurality of predetermined algorithms, and the plurality of predetermined algorithms are noise reduction algorithms.

4. The audio signal processing method as claimed in claim 1, wherein performing the classification on the digital audio signal to determine the specific classification corresponding to the digital audio signal comprises:

obtaining a type of sound of the digital audio signal; and determining the specific classification of the digital audio signal according to the type of sound.

5. The audio signal processing method as claimed in claim 4, wherein the plurality of predetermined classifications are associated with a plurality of predetermined algorithms, and the plurality of predetermined algorithms are sound recognition algorithms.

6. The audio signal processing method as claimed in claim 1, wherein the plurality of resource configurations correspond to different levels of computing resources, and the at least two predetermined classifications correspond to different predetermined algorithms.

7. The audio signal processing method as claimed in claim 1, wherein performing the classification on the digital audio signal to determine the specific classification corresponding to the digital audio signal comprises:

obtaining at least one audio feature of the digital audio signal; and determining the specific classification of the digital audio signal according to the at least one audio feature.

8. The audio signal processing method as claimed in claim 7, wherein the at least one audio feature comprises at least one of a time-domain feature, a frequency-domain feature, a rhythmic feature, and a statistical feature.

9. The audio signal processing method as claimed in claim 1, wherein processing the digital audio signal based on a specific resource configuration corresponding to the specific classification comprising:

processing the digital audio signal based on the specific resource configuration and further based on a specific algorithm corresponding to the specific classification, wherein the specific algorithm is one of a plurality of predetermined algorithms, and the plurality of predetermined algorithms are associated with the plurality of predetermined classifications.

10. An audio signal processing device comprising:

a storage device configured to store a classification model; and a processor configured to load the classification model from the storage device and perform the classification model on a digital audio signal to determine a specific classification corresponding to the digital audio signal, wherein the specific classification is one of a plurality of predetermined classifications, the plurality of predetermined classifications comprise at least two predetermined classifications for a sound situation, and the at least two predetermined classifications correspond to different resource configurations, wherein the processor is further configured to process the digital audio signal based on a specific resource configuration corresponding to the specific classification, and wherein the specific resource configuration is one of a plurality of predetermined resource configurations, and the plurality of predetermined resource configurations are associated with the plurality of predetermined classifications;

wherein the specific resource configuration comprises at least two of an operating voltage, an operating frequency, clock resource, an operating state of an SRAM, an operating state of a DRAM, and/or an operating state of a co-processor.

11. The audio signal processing device as claimed in claim 10, wherein the processor is further configured to obtain a speech confidence score (SCS) of the digital audio signal and to determine the specific classification of the digital audio signal according to the SCS.

12. The audio signal processing device as claimed in claim 11, wherein the plurality of predetermined classifications are associated with a plurality of predetermined algorithms, and the plurality of determined algorithms are noise reduction algorithms.

13. The audio signal processing device as claimed in claim 10, wherein the processor is configured to obtain a type of sound of the digital audio signal and to determine the specific classification of the digital audio signal according to the type of sound.

14. The audio signal processing device as claimed in claim 13, wherein the plurality of predetermined classifications are associated with a plurality of predetermined algorithms, and the plurality of determined algorithms are sound recognition algorithms.

15. The audio signal processing device as claimed in claim 10, wherein the plurality of resource configurations correspond to different levels of computing resources, and the at least two predetermined classifications correspond to different predetermined algorithms.

16. The audio signal processing device as claimed in claim 10, wherein the processor is configured to obtain at least one audio feature of the digital audio signal and determine the specific classification of the digital audio signal according to the at least one audio feature.

17. The audio signal processing device as claimed in claim 16, wherein the at least one audio feature comprises at least one of a time-domain feature, a frequency-domain feature, a rhythmic feature, and a statistical feature.

18. The audio signal processing device as claimed in claim 10, wherein the processor is configured to process the digital audio signal based on the specific resource configuration and further based on a specific algorithm corresponding to the specific classification, and wherein the specific algorithm is one of a plurality of predetermined algorithms, and the plurality of predetermined algorithms are associated with the plurality of predetermined classifications.

* * * * *